Jan. 8, 1935. A. E. GRANT 1,987,474
SCREW
Filed April 30, 1932

INVENTOR
Albert E. Grant
BY
Ashley & Ashley
ATTORNEYS

Patented Jan. 8, 1935

1,987,474

UNITED STATES PATENT OFFICE 1,987,474

SCREW

Albert E. Grant, New York, N. Y.

Application April 30, 1932, Serial No. 608,419

3 Claims. (Cl. 85—47)

My invention relates to screws and the object of my invention is to provide, as a new article of manufacture, a screw having teeth thereon adapted to cut an internal thread in the cylindrical walls of a receiving bore. Further objects are to provide an external screw and an internal thread in exact fitting engagement and to provide a screw which may be simply and cheaply made by stamping.

Referring to the accompanying drawing.

Figure 1:
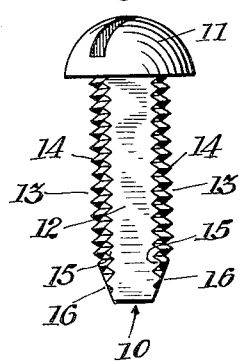
Fig. 1 is a vertical elevation of a screw embodying the features of novelty which constitute my invention.
Figure 2:
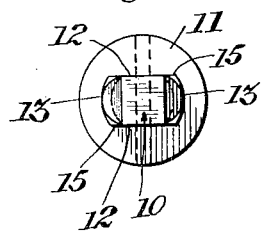
Fig. 2 is an inverted plan view thereof.
Figure 6:
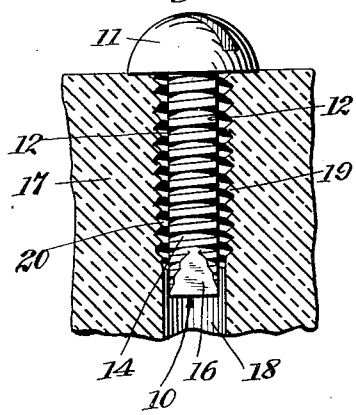
Fig. 6 is a sectional view taken at right angles to Fig. 3.
Figure 3:
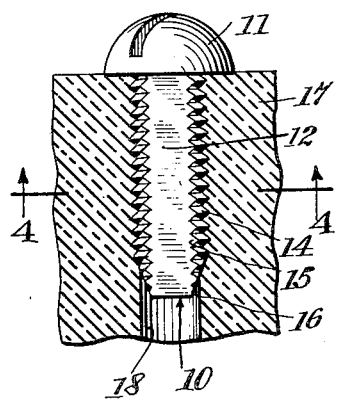
Fig. 3 is a sectional view showing the screw in engagement with an internal thread which has been cut by the screw in the wall of a cylindrical bore formed in hard rubber, or other such composition material.
Figure 5:
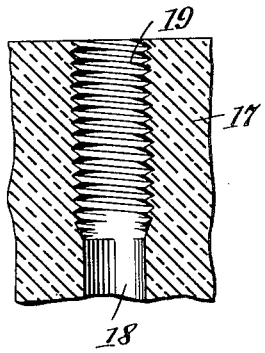
Fig. 5 is a section similar to Fig. 3 with the screw removed to show the thread cut in the wall of the bore.
Figure 4:
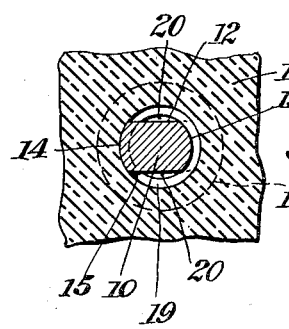
Fig. 4 is a sectional view taken on lines 4—4 of Fig. 3.

The screw comprises a metal pin or shank 10 having a slotted head 11 formed integral thereon in the usual manner. The shank is produced from obround wire or bar stock having flat surfaces 12—12 on diametrically opposite sides and rounded connecting surfaces 13—13. Spiral ridges 14—14 etc., are pressed into the rounded sides of the shank by die stamping, the flat surfaces 12—12 serving to hold the shank from rotation in the pressing dies.

The ridges 14 are all formed at an equal angle to the axis of the shank 10 and each ridge terminates abruptly at the surfaces 12 to form cutting teeth 15—15 etc. The ridges on the one side of the shank are properly offset relative to those on the opposite side so that an interrupted male thread is formed. Adjacent the entering end, or tip, of the screw, its rounded ridged sides are tapered, as at 16—16.

17 indicates a block of composition material having a straight cylindrical bore 18 therein. The diameter of the bore must be smaller than the greatest diameter of the screw and not less than the diameter thereof at the bottom of the ridges 14, but may vary between these limits depending upon the relative hardness of the materials employed, the size of the screw etc.

To engage the screw in the bore 18, its tapered tip is inserted in one end of the bore and the screw is rotated from left to right by a screw driver held in engagement with its slotted head in the usual manner of driving screws. Thus the teeth 15 are forced to mill a continuous spiral thread or groove in the wall of the bore and the ridges 14 follow in the same helical path, the material cut away from the bore wall being forced into the spaces 20 between the flat surfaces 12 of the screw and the wall of the bore.

It will be noted that the depth of cut made by the teeth 15 on the tapered portions 16 of the screw is less than the full depth of the thread 19 and that each successive tooth along this tapered portion of the screw will progressively increase the depth of the groove until it attains its full diameter when the first tooth above the taper has followed thru. The succeeding teeth, therefore, do not function as thread cutters.

From the foregoing it will be understood that it is not necessary to provide the teeth 15 on all of the ridges above the taper and that such cutting edges are formed incidental to the method of making the screw by the stamping operation heretofore referred to.

While I have illustrated the screw threaded in composition material, I have found that when made of steel it will tap a receiving thread satisfactorily in brass and other and harder material, especially if the screw be hardened and/or the diameter of the bore made appreciably larger than the root diameter of the screw. The screw may be removed and returned in the bore an indefinite number of times and has the advantage, in addition to economy, that an exact thread fit is obtained by its use.

Having thus described my invention, I claim:

1. A screw comprising a shank having a head formed on one end thereof and oppositely disposed flat faces throughout its entire length below the head, and rounded portions oppositely disposed intermediate said faces, and helical teeth on said rounded portions extending throughout the length of the shank, the toothed rounded portions at the tip of the shank being chamfered and the remaining portion of said shank being of uniform cross sectional area.

2. A screw comprising a shank having a head upset on one end thereof and oppositely disposed flat faces throughout its entire length below the head, and rounded portions oppositely disposed intermediate said faces, and helical teeth stamped offset in said rounded portions and extending throughout the length of the shank, the toothed rounded portions at the tip of the shank being chamfered and the remaining portion of said shank being of uniform cross sectional area.

3. A screw comprising a shank of flat wire having rounded edges and a head upset on one end thereof, and helical teeth stamped in said rounded edges and extending throughout the length of the shank below the head, the toothed rounded edges at the tip of the shank being chamfered and the remaining portion of the shank being of uniform cross sectional area.

ALBERT E. GRANT.